(12) United States Patent
Yun et al.

(10) Patent No.: US 8,559,417 B2
(45) Date of Patent: Oct. 15, 2013

(54) TERMINAL, METHOD FOR OPERATING THE TERMINAL, AND METHOD FOR INTERWORKING IN WIRELESS COMMUNICATION SYSTEM INCLUDING 3GPP LTE NETWORK AND 3GPP LEGACY NETWORK

(75) Inventors: Ji-Hoon Yun, Seoul (KR); Ki-Ho Cho, Songnam-si (KR); Ji-Cheol Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 376 days.

(21) Appl. No.: 12/623,301

(22) Filed: Nov. 20, 2009

(65) Prior Publication Data
US 2011/0122862 A1   May 26, 2011

(51) Int. Cl.
H04L 12/66     (2006.01)

(52) U.S. Cl.
USPC ............ 370/352; 455/436; 455/458; 455/515

(58) Field of Classification Search
None
See application file for complete search history.

(56) References Cited

U.S. PATENT DOCUMENTS

| | | | | |
|---|---|---|---|---|
| 2007/0171850 A1* | 7/2007 | Feder et al. | ................... | 370/311 |
| 2009/0285157 A1* | 11/2009 | Yeoum et al. | ................ | 370/328 |
| 2010/0075679 A1* | 3/2010 | Tenny et al. | .................. | 455/436 |

OTHER PUBLICATIONS

3GPP TS 23.272, 3rd Generation Partnership Project; Technical Specification Group Services and System Aspects; Circuit Switched Fallback in Evolved Packet System; Stage 2 (Release 9), Technical Specification, Sep. 2009, V9.1.0.

* cited by examiner

*Primary Examiner* — Yong Zhou
(74) *Attorney, Agent, or Firm* — Jefferson IP Law, LLP

(57) ABSTRACT

A terminal, a method for operation of the terminal, and a method of interworking in a wireless communication system including an advanced network and a legacy network are provided. The method for operating the terminal includes monitoring a paging channel of the legacy network for a data paging message and a Circuit Switched (CS) paging message, when the terminal is in an idle state, receiving one of the CS paging message and data paging message, establishing a connection with the legacy network corresponding to the received one of the CS paging message and data paging message, wherein a CS voice connection is established with the legacy network if the CS paging message is received and a Packet Switched (PS) data connection is established with the legacy network if the data paging message is received, and performing a handover to the advanced network from the legacy network, if the PS data connection is established with the legacy network.

16 Claims, 3 Drawing Sheets

TERMINAL, METHOD FOR OPERATING THE TERMINAL, AND METHOD FOR INTERWORKING IN WIRELESS COMMUNICATION SYSTEM INCLUDING 3GPP LTE NETWORK AND 3GPP LEGACY NETWORK

BACKGROUND OF THE INVENTION

1. Field of the Invention

The present invention relates to a wireless communication system. More particularly, the present invention relates to a terminal, method for operating the terminal, and method for interworking in a wireless communication system including a $3^{rd}$ Generation Partnership Project (3GPP) Long Term Evolution (LTE) network and 3GPP legacy network.

2. Description of the Related Art

Research is being conducted to develop a next generation communication system. A representative example of the next generation communication system is a communication system based on the $3^{rd}$ Generation Partnership Project (3GPP) Long Term Evolution (LTE) standard (hereafter referred to as an LTE network). When the LTE network is deployed, it is expected that the LTE network will coexist with a legacy communication system in an overlay mode. A representative example of the legacy communication system is a communication system based on a 3GPP Wideband Code Division Multiple Access (WCDMA) standard (hereafter referred to as a WCDMA network).

When an operator newly deploys the LTE network in the overlay mode, the operator may support a voice service through the WCDMA network and may support a data service through the LTE network. When the voice service is supported through the WCDMA network, the voice service may be referred to as a Circuit Switched (CS) voice service. When the LTE network is deployed in the overlay mode, a terminal for use therein should be a dual mode terminal that supports a Radio Access Technology (RAT) of both the WCDMA network and the LTE network. In addition, the terminal should be capable of receiving paging messages of the WCDMA network and the LTE network.

To support the CS voice service through the WCDMA network and to support the data service through the LTE network, a conventional function referred to as CS fallback may be employed. An example of the conventional CS fallback will be described below with reference to FIG. 1.

FIG. 1 illustrates a system configuration for conventional CS fallback between the LTE network and a WCDMA network.

Referring to FIG. 1, a system configuration for CS fallback between the LTE network and the WCDMA network includes a terminal 100, a Universal Mobile Telecommunications System (UMTS) Terrestrial Radio Access Network (UTRAN) 110, a Global System for Mobile communications (GSM) Enhanced Data Rates for GSM Evolution (EDGE) Radio Access Network (GERAN) 112, a Serving General Packet Radio Service (GPRS) Support Node (SGSN) 114, a Mobile Switching Center (MSC) 116, an Evolved-UTRAN (E-UTRAN) 120, a Mobility Management Entity (MME) 122. The terminal 100 is common to both the LTE network and the WCDMA network. The UTRAN 110, GERAN 112, SGSN 114, and MSC 116 are included in the WCDMA network. The E-UTRAN 120 and MME 122 are included in the LTE network.

In the WCDMA network, the terminal 100 communicates with the UTRAN 110 via a Uu interface and the GERAN 112 via a Um interface. The UTRAN 110 communicates with the SGSN 114 via an Iu-ps interface and the MSC 116 via an Iu-cs interface. The GERAN 112 communicates with the SGSN 114 via a Gb interface and the MSC 116 via an A interface. The SGSN 114 communicates with the MSC 116 via a GS interface.

In the LTE network, the terminal 100 communicates with the E-UTRAN 110 via an LTE-Uu interface and the E-UTRAN 110 communicates with the MME 122 via an S1-MME interface.

The LTE network and the WCDMA network are connected to each other through an SGs interface between the MME and the MSC and an S3 interface between the MME and the SGSN.

When the MSC 116 receives a call request voice service, the MSC sends a CS paging message to the terminal 100 through a WCDMA cell in which the terminal 100 is located. However, when the terminal 100 is located in an LTE cell, the MSC sends a CS paging message to the terminal 100 through the LTE cell via the MME 122.

The terminal 100 registers with the MSC 116 to inform the MSC 116 of its location so that the MSC 116 is aware of the location of the terminal 100. When the terminal 100 is within a service coverage area of the LTE network, the LTE network performs tunneling for the CS paging message between the terminal 100 and the MSC 116 of the WCDMA network and for control messages used for a registration area update procedure. When the terminal 100 receives the CS paging message through the LTE network, the terminal 100 releases its connection with the LTE network and connects to the WCDMA network. The terminal 100 sends a CS paging response message through the WCDMA network, after which, the WCDMA CS voice service is initiated. Therefore, as described above, the CS fallback allows the terminal to receive a paging message from the WCDMA network, even when the terminal is connected to the LTE network.

However, when the operator newly deploys the LTE network in the overlay mode, it is expected that the coverage area and signal quality of the early LTE network will be limited compared to the WCDMA network. That is, there will be areas that are serviced by the WCDMA network that are not serviced by the LTE network. In addition, there will be areas that are serviced by the LTE network in which the terminal poorly receives signals from the LTE network. In this environment, there may be a number of problems that are encountered, such as those listed below, when receiving the CS paging message through LTE network using the conventional CS fallback.

One problem with the conventional CS fallback involves deterioration of a paging receiving ratio. This problem is experienced when a paging message is lost due to a low quality signal received from the LTE network. As a result, there may be a delay before a CS voice service of the WCDMA network is established or there may be a failure to establish the CS voice service of the WCDMA network. The CS voice service is one of the basic services of a wireless network, and thus a receiving ratio for the CS voice service is an important element of the quality of service sensed by the user.

Another problem with the conventional CS fallback involves the switching by the terminal from the LTE network to the WCDMA network for a voice call. The CS voice service is provided by the WCDMA network after receiving a CS paging message through the LTE network. To achieve this, the terminal has to switch from the LTE network to the WCDMA network. The switching from the LTE network to the WCDMA network introduces a delay before the start of the voice service. The delay affects the quality of service sensed by the user.

Yet another problem with the conventional CS fallback is that, due to the inconsistent service coverage area of the LTE network, the terminal frequently switches between the LTE network and the WCDMA network. In the conventional CS fallback, it is required that the terminal camp on the LTE network when it is available and only camp on the WCDMA network when the LTE network is not available. In addition, when the terminal is camped on the WCDMA network, the terminal should continuously search for the LTE network and camp on the LTE network once it is found. However, these operations result in a consumption of the terminal's battery power and a reduction of the efficiency of both the WCDMA network and the LTE network.

One technique that may be employed to address the shortcomings of the conventional CS fallback is to employ a hybrid operation on the terminal. The hybrid operation denotes that the terminal takes turns monitoring a paging channel in the WCDMA network and the LTE network. In the hybrid operation, the terminal may maintain a substantially identical receiving ratio because the terminal receives the CS paging messages through an air interface with the WCDMA network. However, in the hybrid operation, the terminal switches to the WCDMA network even when the terminal is sending/receiving data through an active connection with the LTE network. Accordingly, performance of the LTE network is compromised.

Therefore, a need exists for an apparatus and method for enhancing a receiving ratio of the CS voice service with greater reliability than the conventional CS fallback, while not decreasing performance of the LTE network.

SUMMARY OF THE INVENTION

An aspect of the present invention is to address at least the above-mentioned problems and/or disadvantages and to provide at least the advantages described below. Accordingly, an aspect of the present invention is to provide a terminal, method for operating the terminal, and method for interworking in a wireless communication system including a 3$^{rd}$ Generation Partnership Project (3GPP) Long Term Evolution (LTE) network and 3GPP Wideband Code Division Multiple Access (WCDMA) network, which are deployed in an overlay mode.

Another aspect of the present invention is to provide an apparatus and method for enhancing a receiving ratio of a Circuit Switched (CS) voice service with greater reliability than the conventional CS fallback, while not decreasing performance of the LTE network.

In accordance with an aspect of the present invention, a method for operating a terminal in a wireless communication system including an advanced network and a legacy is provided. The method includes monitoring a paging channel of the legacy network for a data paging message and a CS paging message, when the terminal is in an idle state, receiving one of the CS paging message and data paging message, establishing a connection with the legacy network corresponding to the received one of the CS paging message and data paging message, wherein a CS voice connection is established with the legacy network if the CS paging message is received and a Packet Switched (PS) data connection is established with the legacy network if the data paging message is received, and performing a handover to the advanced network from the legacy network, if the PS data connection is established with the legacy network.

In accordance with another aspect of the present invention, a terminal for use in a wireless communication system including an advanced network and a legacy network is provided. The terminal includes a transmitter for transmitting signals to the advanced network and the legacy network, a receiver for receiving signals from the advanced network and the legacy network, and a controller for controlling the transmitter and receiver, for controlling to monitor a paging channel of the legacy network for a data paging message and a CS paging message, when the terminal is in an idle state, for controlling to determine if one of the CS paging message and data paging message are received, for controlling, if one of the CS paging message and data paging message are received, for controlling to establish a connection with the legacy network corresponding to the received one of the CS paging message and data paging message, wherein a CS voice connection is established with the legacy network if the CS paging message is received and a PS data connection is established with the legacy network if the data paging message is received, and for controlling to perform a handover to the advanced network from the legacy network, if the PS data connection is established with the legacy network.

In accordance with yet another aspect of the present invention, a method for interworking in a wireless communication system including a terminal, an advanced network and a legacy network is provided. The method includes receiving, by the legacy network, one of a CS voice call request and PS data for the terminal, when the terminal is in an idle state, transmitting to the terminal, by the legacy network, a CS paging message if the CS voice call request is received and a data paging message if the PS data is received, receiving, by the terminal, one of the CS paging message and the data paging message while the terminal is in the idle state, establishing a connection for data service between the terminal and the legacy network, if the terminal receives the data paging message, and performing an active handover of the connection for the data service between the terminal and the legacy network to a connection for the data service between the terminal and the advanced network.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
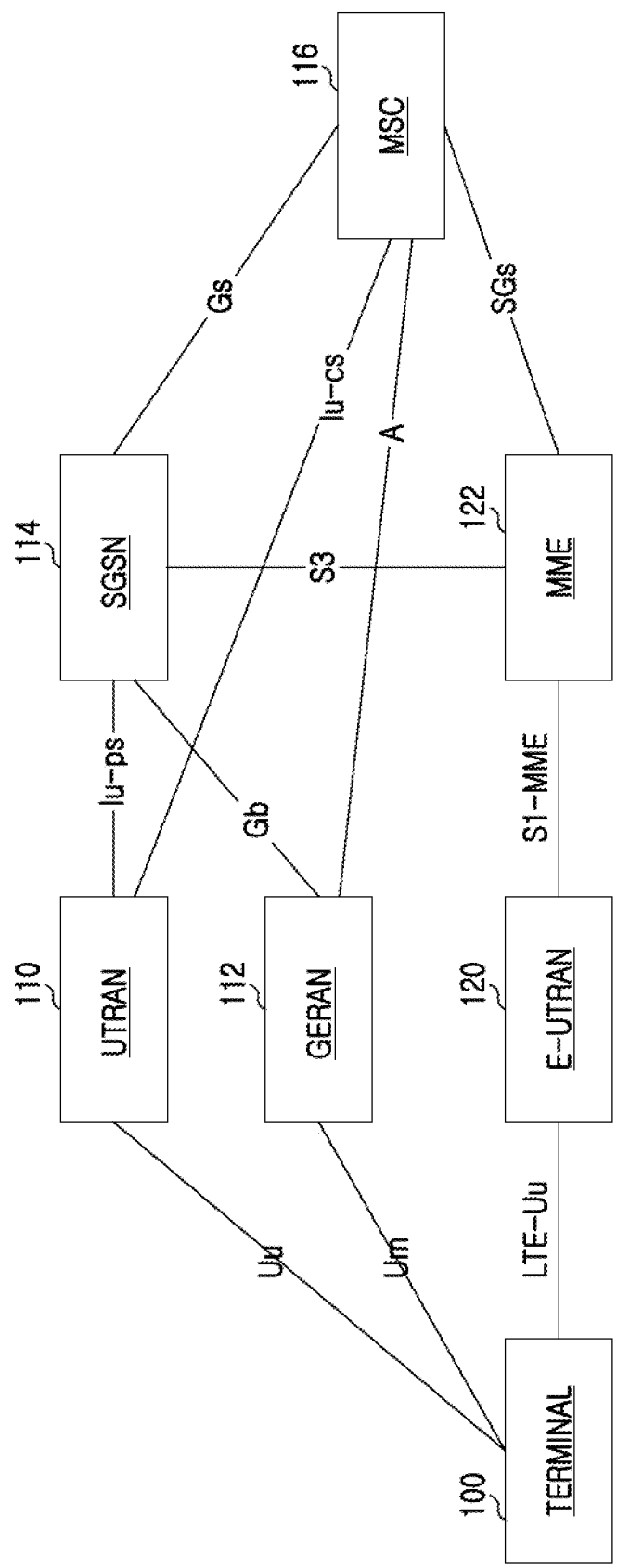
FIG. 1 illustrates a system configuration for conventional Circuit Switched (CS) fallback between the Long Term Evolution (LTE) network and a Wideband Code Division Multiple Access (WCDMA) network.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention described below relate to an interworking between a communication system based on a $3^{rd}$ Generation Partnership Project (3GPP) Long Term Evolution (LTE) standard (hereafter referred to as a LTE network) and a communication system based on a legacy 3GPP standard. While a communication system based on the legacy 3GPP Wideband Code Division Multiple Access (WCDMA) standard (hereafter referred to as a WCDMA network) will hereafter be used as a representative example of a communication system based on a legacy 3GPP standard, the present invention is not limited thereto and is equally applicable to any communication system based on a legacy 3GPP standard.

It should be understood that the following description refers to terms utilized in various standards merely for simplicity of explanation. For example, the following description refers to terms utilized in the 3GPP LTE standard and the 3GPP WCDMA standard. However, this description should not be interpreted as being limited to the 3GPP LTE and 3GPP WCDMA standards. Independent of the mechanism used for interworking, it is preferable to use interworking as described herein and it is advantageous for that ability to conform to a standardized mechanism.

Exemplary embodiments of the present invention are described below under the assumption that an LTE network and a WCDMA network coexist in an overlay mode and that a terminal (also referred to as User Equipment (UE)) is provided a voice service from the WCDMA network and is provided a data service from the LTE network. Accordingly, the terminal should be an LTE-WCDMA dual mode terminal. However, despite the terminal being a dual mode terminal, it is assumed that the terminal cannot simultaneously receive an LTE signal and a WCDMA signal. When the voice service is supported through the WCDMA network, the voice service may be referred to as a Circuit Switched (CS) voice service.

An LTE Base Station (BS) (also referred to as an evolved Node B (eNB)) and WCDMA BS may be co-located or may be located separately from each other. The LTE network and WCDMA network have substantially the same configuration and interworking interfaces as those described above with respect to FIG. 1. Thus, the LTE network and the WCDMA network are connected to each other through an SGs interface between a Mobility Management Entity (MME) and a Mobile Switching Center (MSC) and an S3 interface between the MME and a Serving General Packet Radio Service (GPRS) Support Node (SGSN).

Exemplary embodiments of the present invention propose a modification to the conventional CS fallback. The modification to the conventional CS fallback according to exemplary embodiments of the present invention is summarized below in Table 1.

TABLE 1

| terminal status | LTE-WCDMA interworking |
|---|---|
| Idle | CS paging: via WCDMA network |
| | Data paging: via WCDMA network |
| LTE active | CS paging: via LTE network |

As shown in Table 1, when the terminal is in an active mode with the LTE network, the conventional CS fallback is implemented. In other words, when the terminal is in an active mode with the LTE network, CS paging is received via the LTE network. However, when the terminal is in an idle mode, CS paging and data paging are received via the WCDMA network. This differs from the conventional CS fallback in that CS paging is directly received via the WCDMA network instead of being tunneled though and received from the LTE network, and that data paging is received by the WCDMA network instead being directly received from the LTE network.

The modification to the conventional CS fallback according to exemplary embodiments of the present invention may yield a number of advantages over the conventional CS fallback. For example, since the terminal receives the CS paging through the LTE network in the LTE active mode, the terminal does not have to switch to the WCDMA network to receive the CS paging message, thereby preventing deterioration of the LTE network's performance.

In addition, the modification to the conventional CS fallback according to exemplary embodiments of the present invention may yield an improvement in a CS paging receiving ratio. Since the terminal receives the CS paging through the LTE network in the LTE active mode and the terminal receives the CS paging through the WCDMA network in the LTE idle mode, the terminal may maintain a CS paging receiving ratio that is similar to that of the WCDMA network. This is because the CS paging will occur via the WCDMA network regardless of whether the terminal is in an LTE service coverage area.

The interworking between the LTE network and the WCDMA network according to an exemplary embodiment of the present invention will be described in more detail below with reference to FIG. 2.

Figure 2:
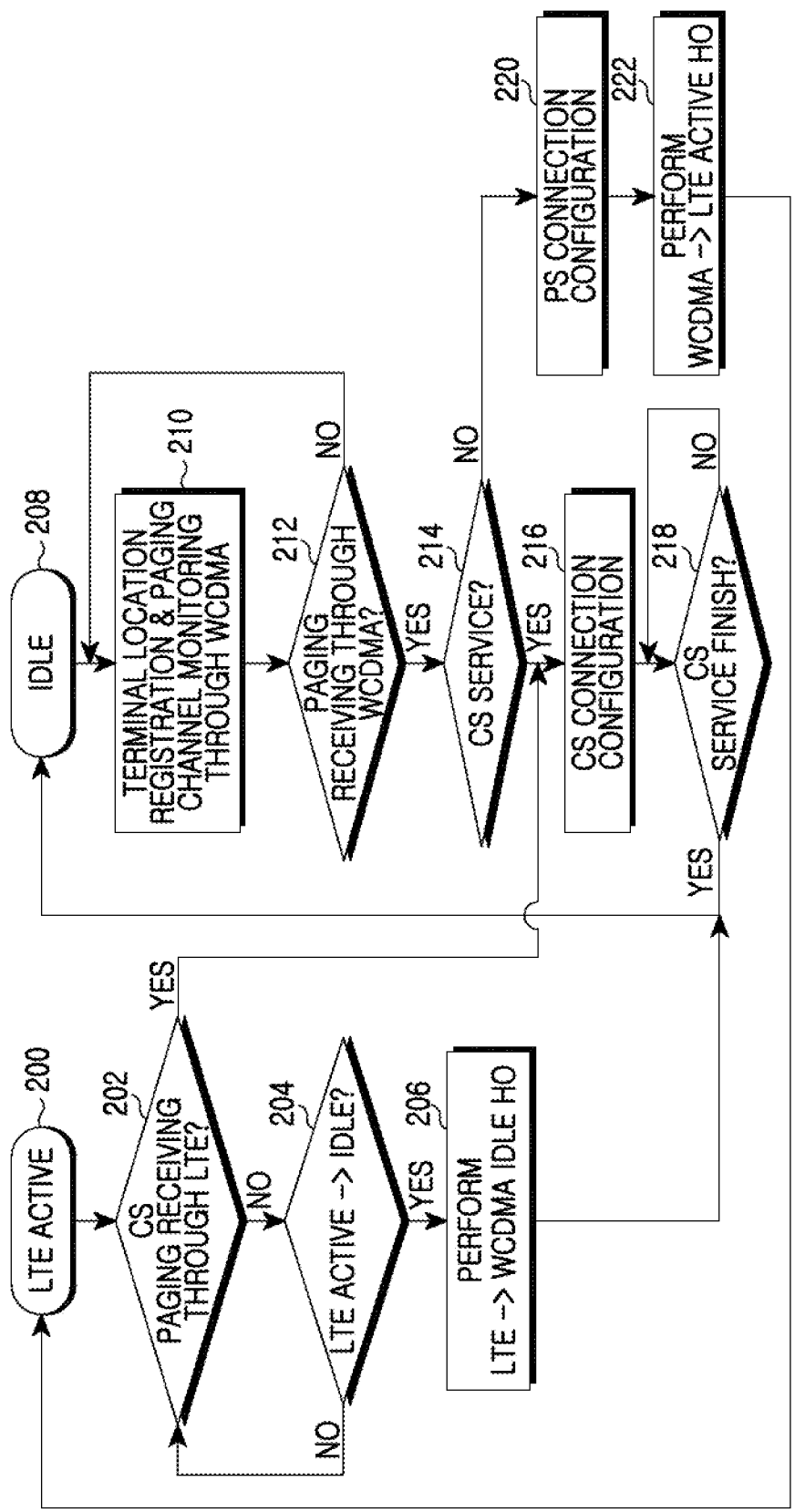
FIG. 2 illustrates a procedure for interworking an LTE network and a WCDMA network, according to an exemplary embodiment of the present invention.

FIG. 2 illustrates a procedure for interworking an LTE network and a WCDMA network, according to an exemplary embodiment of the present invention.

Referring to FIG. 2, in step 200 the terminal is in an LTE active state. The LTE active state denotes that a Radio Resource Control (RRC) connection state of the terminal with the LTE network is RRC_CONNECTED and therefore the terminal is in a state in which it is capable of sending data to and receiving data from the LTE network. In step 202, the terminal determines if a CS paging message is received through the LTE network. Herein, a CS paging message received through the LTE network originates from the legacy network in response to a received CS voice call request, is tunneled through the LTE network, and the tunneled CS paging message is transmitted to the terminal via the LTE network. If the terminal determines that a CS paging message is received through the LTE network at step 202, the terminal proceeds to step 216, which is described below. However, if the terminal determines that a CS paging message is not received through the LTE network at step 202, the terminal determines if the LTE active connection has terminated and transitions to an RRC_IDLE RRC state in step 204. If the terminal determines that the LTE active connection has not terminated at step 204, the terminal returns to step 202. However, if the terminal determines that the LTE active connection has terminated and the terminal is to transition to the idle state, the terminal proceeds to step 206 and performs an idle handover from the LTE network to the WCDMA network. Through the idle handover from the LTE network to the WCDMA network, a data path of a Public Data Network (PDN)-Gateway (P-GW) is moved from a Serving-Gateway (S-GW) to a Serving General Packet Radio Service (GPRS) Support Node (SGSN). Therefore, when data arrives at the P-GW, the P-GW sends the data to the SGSN and the SGSN sends a data paging message to the terminal through the WCDMA network. When a location of the terminal is registered to the SGSN, it is assumed that the SGSN notifies a Mobile Switching Center (MSC) of the terminals location. Thereafter, the terminal proceeds to step 208.

In step 208 the terminal in an idle state. The idle state denotes that that the terminal does not have a connection with the LTE network or WCDMA network. In step 210, while the terminal is in an idle state, the terminal performs a location registration to the MSC/SGSN and monitors the paging channel of the WCDMA network for CS paging messages and data paging messages. Here, the terminal does not have to monitor the paging channel of the LTE network. In step 212, the terminal determines if a paging message is received from the WCDMA network. If the terminal determines that a paging message from the WCDMA network is not received at step 212, the terminal returns to step 210. However, if the terminal determines that a paging message is received at step 212, the terminal determines if the received paging message is a CS paging message or a data paging message in step 214. If the terminal determines that the received paging message is a CS paging message, the terminal proceeds to step 216 and establishes a connection with the WCDMA network. In step 218, the terminal determines if it the WCDMA service is terminated. When the terminal determines at step 218 that the WCDMA service is terminated, the terminal returns to step 208.

Returning to step 214, if the terminal determines that the received paging message is a data paging message, the terminal proceeds to step 220 and establishes a Packet Switching (PS) connection with the WCDMA network. After the terminal establishes the PS connection with the WCDMA network at step 220, and when the terminal locates the LTE network, the terminal performs an active handover from WCDMA network to the LTE network. Here, the terminal searches for the LTE network after the PS connection with the WCDMA network is established. Once the terminal determines it is in the service coverage area of the LTE network, the terminal switches to the data service offered by the LTE network to take advantage of the better performance of the LTE network. Thereafter, the terminal returns to step 200.

An exemplary structure of a terminal for use in an LTE network and a WCDMA network deployed in an overly mode is described below with reference to FIG. 3.

Figure 3:
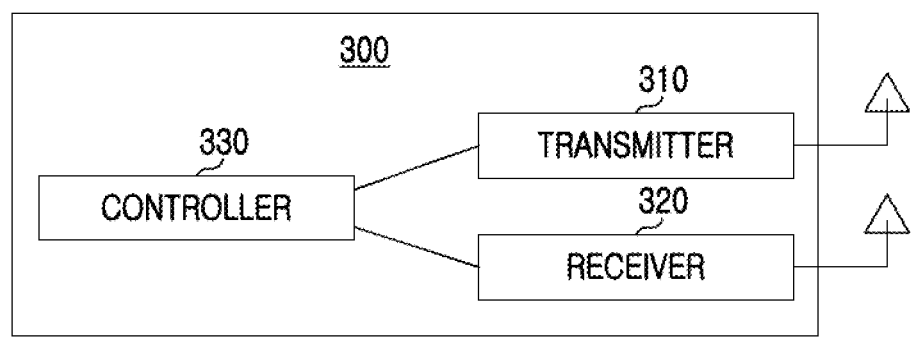
FIG. 3 illustrates a structure of a terminal for use in an LTE network and a WCDMA network deployed in an overlay mode according to an exemplary embodiment of the present invention.

FIG. 3 illustrates a structure of a terminal for use in an LTE network and a WCDMA network deployed in an overlay mode according to an exemplary embodiment of the present invention.

Referring to FIG. 3, the terminal 300 includes a transmitter 310, a receiver 320, and a controller 330. The terminal 300 may include any number of additional structural elements. However, a description of additional structural elements of the terminal 300 is omitted for conciseness.

The transmitter 310 transmits signals to the LTE network and the WCDMA network. The transmitter 310 may support the Radio Access Technology (RAT) of both the LTE network and the WCDMA network. The transmitter 310 may be able to switch between transmitting to the LTE network and the WCDMA network. Alternatively, the transmitter 310 may be able to simultaneously transmit to the LTE network and the WCDMA network. The transmitter 310 may comprise a plurality of transmitters.

The receiver 320 receives signals from the LTE network and the WCDMA network. The receiver 320 may support the RAT of both the LTE network and the WCDMA network. The receiver 320 may be able to switch between receiving from the LTE network and the WCDMA network. Alternatively, the receiver 320 may be able to simultaneously receive from the LTE network and the WCDMA network. The receiver 320 may comprise a plurality of receivers. The transmitter 310 and the receiver 320 may be a transceiver.

The controller 330 controls the transmitter 310 and the receiver 320 and controls the operations of the terminal 300. The operations of the terminal 300 include any of the operations explicitly or implicitly described above as being performed by a terminal. For example, the controller 330 may control to monitor a paging channel of the legacy network for a data paging message and a CS paging message, when the terminal 300 is in an idle state, for controlling to determine if one of the CS paging message and data paging message are received, for controlling, if one of the CS paging message and data paging message are received, for controlling to establish a connection with the legacy network corresponding to the received one of the CS paging message and data paging message, wherein a CS voice connection is established with the legacy network if the CS paging message is received and a PS data connection is established with the legacy network if the data paging message is received, and for controlling to perform a handover to the LTE network from the legacy network, if the PS data connection is established with the legacy network.

Accordingly, exemplary embodiments of the present invention are beneficial in that a quality of a voice service, which is a basic service of a wireless communication system, may be enhanced by improving the paging receiving probability for the WCDMA voice service without deteriorating LTE performance, when the LTE network and the WCDMA network are co-located in overlay mode and when the coverage of the LTE network is limited.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a terminal in a wireless communication system overlying both an advanced network and a legacy network, the method comprising:
   if the terminal is in an active state for the advanced network, receiving a Circuit Switched (CS) paging message through the advanced network; and
   if the terminal is in an idle state, receiving the CS paging message and the data paging message through the legacy network,
   wherein the legacy network comprises a Wideband Code Division Multiple Access (WCDMA) network, and the advanced network comprises a Long Term Evolution (LTE) network.

2. The method of claim 1, further comprising:
   when the terminal is in the idle state,
   establishing a connection with the legacy network corresponding to the received one of the CS paging message and data paging message, wherein a CS voice connection is established with the legacy network if the CS paging message is received and a Packet Switched (PS) data connection is established with the legacy network if the data paging message is received; and
   performing a handover to the advanced network from the legacy network, after the PS data connection is established with the legacy network.

3. The method of claim 2, further comprising performing location registration with the legacy network via the legacy network, when the terminal is in the idle state.

4. The method of claim 2, further comprising:
   monitoring for a CS paging message when the terminal is connected to the advanced network;
   transitioning to an idle state from a state where the terminal is connected to the advanced network; and
   performing a handover from the advanced network to the legacy network upon transitioning to the idle state.

5. The method of claim 2, wherein the performing of the handover to the advanced network from the legacy network, if the PS data connection is established with the legacy network, comprises:
   if the PS data connection is established with the legacy network, determining if the terminal is in a coverage area of the advanced network; and
   when the terminal is in a coverage area of the advanced network, performing the handover to the advanced network from the legacy network.

6. A terminal for use in a wireless communication system including an advanced network and a legacy network, the terminal comprising:
   a transmitter configured to transmit signals to the advanced network and the legacy network;
   a receiver configured to receive signals from the advanced network and the legacy network; and
   a controller configured to control the transmitter and the receiver,
   wherein the controller is further configured so as
      to receive, if the terminal is in an active state for the advanced network, a Circuit Switched (CS) paging message through the advanced network; and
      to receive, if the terminal is in an idle state, the CS paging message and the data paging message through the legacy network,
   wherein the legacy network comprises a Wideband Code Division Multiple Access (WCDMA) network, and the advanced network comprises a Long Term Evolution (LTE) network.

7. The terminal of claim 6, wherein, when the terminal is in the idle state, the controller is further configured to establish a connection with the legacy network corresponding to the received one of the CS paging message and data paging message, wherein a CS voice connection is established with the legacy network if the CS paging message is received and a Packet Switched (PS) data connection is established with the legacy network if the data paging message is received, and configured to perform a handover to the advanced network from the legacy network, after the PS data connection is established with the legacy network.

8. The terminal of claim 7, wherein the controller further controls to perform a location registration with the legacy network via the legacy network, when the terminal is in the idle state.

9. The terminal of claim 7, wherein the controller further controls to monitor for a CS paging message when the terminal is connected to the advanced network, controls to transition the terminal to an idle state from a state where the terminal is connected to the advanced network, and controls to perform a handover from the advanced network to the legacy network upon transitioning to the idle state.

10. The terminal of claim 7, wherein the controller controls to perform the handover to the advanced network from the legacy network, if the PS data connection is established with the legacy network and if the terminal is in a coverage area of the advanced network.

11. A method for interworking in a wireless communication system including a terminal, an advanced network and a legacy network, the method comprising:
   registering, by the terminal, with the advanced network and the legacy network which operate in an overlay mode;
   receiving, by the legacy network, one of a Circuit Switched (CS) voice call request from the legacy network and Packet Switched (PS) data for the terminal from the advanced network, when the terminal is in an idle state;
   transmitting to the terminal, by the legacy network, a CS paging message if the CS voice call request is received and a data paging message if the PS data is received;
   receiving, by the terminal, one of the CS paging message and the data paging message through the legacy network, when the terminal is in the idle state; and
   receiving, by the terminal, the CS paging message through the advanced network, when the terminal is in an active state for the advanced network,
   wherein the legacy network comprises a Wideband Code Division Multiple Access (WCDMA) network and the advanced network comprises a Long Term Evolution (LTE) network.

12. The method of claim 11, further comprising:
   establishing a connection for data service between the terminal and the legacy network, if the terminal receives the data paging message; and
   performing an active handover of the connection for the data service between the terminal and the legacy network to a connection for the data service between the terminal and the advanced network.

13. The method of claim 12, further comprising:
   receiving, by the legacy network, a Circuit Switched (CS) voice call request for the terminal, when the terminal has an active connection to the advanced network;
   receiving, by the advanced network, a CS paging message for the terminal, when the terminal has an active connection to the advanced network;
   tunneling, by the advanced network, the received CS paging message for the terminal through the advanced network;

transmitting, by the advanced network, the tunneled CS paging message to the terminal; and establishing, by the terminal, a CS connection with the legacy network.

14. The method of claim 12, further comprising performing, by the terminal, location registration with the legacy network via the legacy network, when the terminal is in the idle state.

15. The method of claim 12, further comprising:

monitoring, by the terminal, for a CS paging message when the terminal is connected to the advanced network;

transitioning, by the terminal, to an idle state from a state where the terminal is connected to the advanced network; and performing a handover from the advanced network to the legacy network upon transitioning to the idle state.

16. The method of claim 12, wherein the performing of the active handover of the connection for the data service between the terminal and the legacy network to the connection for the data service between the terminal and the advanced network comprises:

determining, by the terminal, if the terminal is in a coverage area of the advanced network; and when the terminal is in a coverage area of the advanced network, performing the active handover of the connection for the data service between the terminal and the legacy network to the connection for the data service between the terminal and the advanced network.

* * * * *